(12) United States Patent
Lee et al.

(10) Patent No.: US 9,753,200 B2
(45) Date of Patent: Sep. 5, 2017

(54) ORGANIC LIGHT EMITTING DIODE DISPLAY

(71) Applicant: SAMSUNG DISPLAY CO., LTD., Yongin-si, Gyeonggi-do (KR)

(72) Inventors: Hee Young Lee, Suwon-si (KR); Yun Jang, Seongnam-si (KR); Hyeon Jeong Sang, Bucheon-si (KR); Eun Mi Seo, Cheonan-si (KR); Suk Choi, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/885,905

(22) Filed: Oct. 16, 2015

(65) Prior Publication Data

US 2016/0291228 A1 Oct. 6, 2016

(30) Foreign Application Priority Data

Apr. 1, 2015 (KR) .................. 10-2015-0046217

(51) Int. Cl.
| | |
|---|---|
| *G02B 5/30* | (2006.01) |
| *G02B 1/08* | (2006.01) |
| *G02B 27/28* | (2006.01) |
| *G02B 5/32* | (2006.01) |

(52) U.S. Cl.
CPC ......... *G02B 5/3016* (2013.01); *G02B 5/3083* (2013.01); *G02B 5/32* (2013.01); *G02B 27/286* (2013.01)

(58) Field of Classification Search
CPC ...... G02B 5/3083; G02B 5/32; G02B 5/3016; G02B 27/286
See application file for complete search history.

(56) References Cited

U.S. PATENT DOCUMENTS

| | | | | |
|---|---|---|---|---|
| 7,110,073 | B2 * | 9/2006 | Hsu ..................... | G02F 1/13363 349/119 |
| 2005/0127820 | A1 * | 6/2005 | Yamazaki ........... | H01L 51/5281 313/501 |
| 2009/0052028 | A1 * | 2/2009 | Umemoto ............ | G02B 5/3083 359/485.01 |
| 2010/0157209 | A1 | 6/2010 | Jang | |
| 2015/0153496 | A1 * | 6/2015 | Kim ..................... | G02B 5/3016 349/194 |

FOREIGN PATENT DOCUMENTS

| | | |
|---|---|---|
| KR | 10-2007-0002222 A | 1/2007 |
| KR | 10-2010-0071459 A | 6/2010 |
| KR | 10-2013-0000310 A | 1/2013 |
| KR | 10-2014-0081418 A | 7/2014 |
| KR | 10-2014-0098419 A | 8/2014 |

\* cited by examiner

*Primary Examiner* — Mariceli Santiago
(74) *Attorney, Agent, or Firm* — Lewis Roca Rothgerber Christie LLP (57) ABSTRACT

An organic light emitting diode display including: a display panel; a first retarder on the display panel and including a first reactive liquid crystal; a second retarder on the first retarder and including a second reactive liquid crystal; and a polarizer on the second retarder, wherein a first optical axis of the first reactive liquid crystal is inclined by 2θ+45° relative to an absorption axis of the polarizer, and a second optical axis of the second reactive liquid crystal is inclined by θ relative to the absorption axis of the polarizer.

17 Claims, 9 Drawing Sheets

|  | Theoretical value | Film | LC Coating |
|---|---|---|---|
| Retardation (550nm) | 137.5 nm | 147.1 nm | 140.6 nm |
| R(450) / R(550) | 0.81 | 0.90 | 0.87 |
| R(650) / R(550) | 1.18 | 1.01 | 1.02 |

ORGANIC LIGHT EMITTING DIODE DISPLAY

CROSS-REFERENCE TO RELATED APPLICATION

This application claims priority to and the benefit of Korean Patent Application No. 10-2015-0046217, filed in the Korean Intellectual Property Office on Apr. 1, 2015, the entire content of which is incorporated herein by reference.

BACKGROUND

1. Field

Aspects of the present invention relate to an organic light emitting diode display, and in some embodiments, to an organic light emitting diode display including a retarder.

2. Description of the Related Art

Generally, representative examples of a flat panel display may include an organic light emitting diode display, a liquid crystal display (LCD), a plasma display panel (PDP), a field emission display (FED), and the like.

Among those, the organic light emitting diode display may be formed devices even with a flexible substrate like plastic, may be driven at a lower voltage of 10V or less, and may have relatively smaller power consumption and more excellent color visibility as compared with a plasma display panel or an inorganic field emission display. Further, the organic light emitting diode display may express three colors of red, green, and blue and thus has drawn much attention by many people as a next-generation display device through its expression of abundant colors.

For anti-reflection of external light, the organic light emitting diode display includes a display panel having a straight polarizer and a λ/4 retarder disposed thereon.

The above information disclosed in this Background section is only for enhancing understanding of the background of the invention and therefore may contain information that does not form prior art.

SUMMARY

One or more embodiments of the present invention are directed toward an organic light emitting diode display with enhanced reflection visual sensitivity in response to a viewing angle.

Further, one or more embodiments of the present invention are directed toward an organic light emitting diode display having an overall slim thickness.

An exemplary embodiment of the present invention provides an organic light emitting diode display including: a display panel; a first retarder positioned on the display panel; a second retarder positioned on the first retarder; and a polarizer positioned on the second retarder, wherein a first optical axis of the first reactive liquid crystal is inclined by 2θ+45° relative to an absorption axis of the polarizer and a second optical axis of the second reactive liquid crystal is inclined by θ relative to the absorption axis of the polarizer.

The first retarder may have a λ/4 phase difference value and the second retarder may have a λ/2 phase difference value.

A thickness of the first retarder may be two times as large as that of a second retarder.

The thickness of the first retarder and the thickness of the second retarder may meet the following Equation:

$$\left(\frac{\Delta n'(\lambda)}{\Delta n'(550m)} - 1\right) = 2x\left(\frac{\Delta n''(\lambda)}{\Delta n''(550m)} - 1\right) \quad \text{Equation 1}$$

$$\underbrace{\phantom{\frac{\Delta n'(\lambda)}{\Delta n'(550m)}}}_{\text{First retarder}} \quad \underbrace{\phantom{\frac{\Delta n''(\lambda)}{\Delta n''(550m)}}}_{\text{Second retarder}}$$

In the above Equation 1, $\Delta n'$ represents a phase difference value in a thickness direction for λ in the first retarder and $\Delta n''$ represents a phase difference value in a thickness direction for λ in the second retarder.

The first retarder may include a first reactive liquid crystal and the second retarder may include a second reactive liquid crystal.

The first retarder may be formed of a liquid crystal coating layer and the second retarder may be formed of a liquid crystal coating layer or an oriented film layer.

The liquid crystal coating layer may include a reverse wavelength dispersion liquid crystal.

The liquid crystal coating layer may include a photo-alignment layer and a liquid crystal layer aligned on the photo-alignment layer.

The liquid crystal coating layer may include reactive mesogen.

The liquid crystal coating layer may be an A-Plate liquid crystal coating layer. The A-plate may be made of a material selected from a group consisting of triacetyl cellulose (TAC), cycloolefin polymer (COP), cycloolefin copolymer (COC), polyethylene terephthalate (PET), polypropylene (PP), polycarbonate (PC), polysulfone (PSF), and a polymethyl methacrylate (PMMA).

The A-plate may have a structure in which polymethyl methacrylate (PMMA), polystyrene (PS), and polymethyl methacrylate (PMMA) are sequentially stacked.

The oriented film layer may be a triacetyl cellulose (TAC)-based, polycarbonate (PC)-based, polymethyl(meta)acrylate-based, polyethylene terephthalate-based, and/or cycloolefin (COP)-based polymer layer.

The first retarder and the second retarder may each be a film patterned retarder (FPR) which includes a plurality of left retarder patterns and a plurality of right retarder patterns.

The polarizer may be a linear polarizer.

The organic light emitting diode display may further include: a first pressure sensitivity adhesive positioned between the first retarder and the second retarder.

The organic light emitting diode display may further include: a second pressure sensitivity adhesive positioned between the second retarder and the polarizer.

The display panel may be flexible, bendable, rollable, foldable, and/or stretchable.

In addition to the above-mentioned technical problems of the present invention, other features and aspects of the present invention will be described below or will be clearly understood to those skilled in the art from the technology and description.

According to an exemplary embodiment of the present invention, the following effects may be obtained.

It is possible to enhance the reflection visual sensitivity in response to the viewing angle by forming the first retarder having the λ/4 phase difference value between the display panel and the polarizer and the second retarder having the λ/2 phase difference value.

It is possible to make the overall thickness slim by forming the first retarder and the second retarder as the liquid crystal coating layer.

It is possible to enhance the wavelength dispersion characteristics by controlling the thicknesses of the first retarder and the second retarder.

Other features and aspects of the present invention may be understood based on the exemplary embodiments of the present invention.

BRIEF DESCRIPTION OF THE DRAWINGS

These and/or other aspects of the embodiments will become apparent and more readily appreciated from the following description, taken in conjunction with the accompanying drawings.

DETAILED DESCRIPTION

In the following detailed description, several exemplary embodiments of the present invention have been shown and described, simply by way of illustration. The present invention may be implemented in various different forms and is not limited to exemplary embodiments provided herein.

Accordingly, the drawings and description are to be regarded as illustrative in nature and not restrictive. Like reference numerals designate like elements throughout the specification.

Further, in exemplary embodiments, since like reference numerals designate like elements having the same configuration, an exemplary embodiment is representatively described, and in other exemplary embodiments, only a configuration different from the exemplary embodiment may be described.

In addition, the size and thickness of each configuration shown in the drawings are arbitrarily shown for understanding and ease of description, but the present invention is not limited thereto.

In the drawings, the thicknesses of layers, films, panels, regions, etc., are exaggerated for clarity. In the drawings, for understanding and ease of description, the thickness of some layers and areas is exaggerated.

In addition, unless explicitly described to the contrary, the word "comprise" and variations such as "comprises" or "comprising", will be understood to imply the inclusion of stated elements but not the exclusion of any other elements. In addition, throughout the specification, the word "on" does not necessarily mean that any element is positioned at an upper side based on a gravity direction, but means that any element is positioned above or below a target portion.

Hereinafter, an organic light emitting diode display according to an exemplary embodiment of the present invention will be described with reference to FIGS. 1 to 3.

Figure 1:
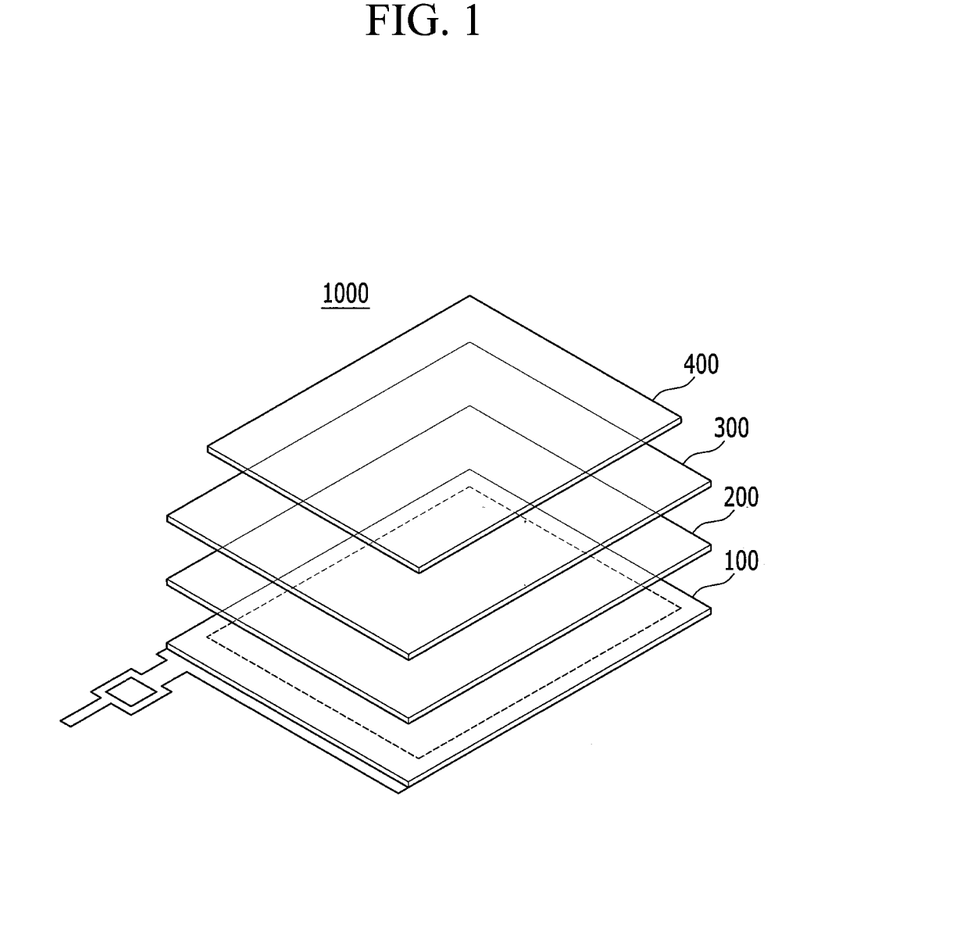
FIG. 1 is a schematic exploded perspective view of an organic light emitting diode display according to an exemplary embodiment of the present invention.
Figure 2:
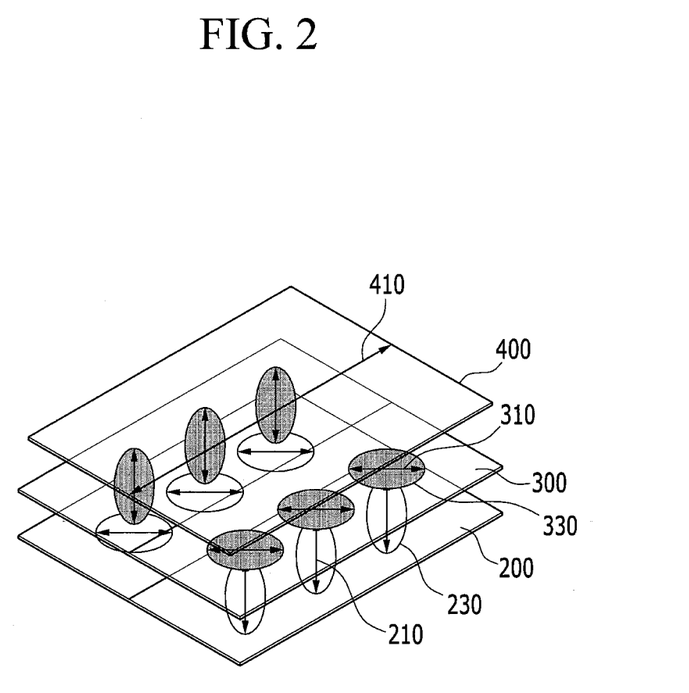
FIG. 2 is a diagram for describing a film patterned retarder (FPR) as of a retarder illustrated in FIG. 1.
Figure 3:
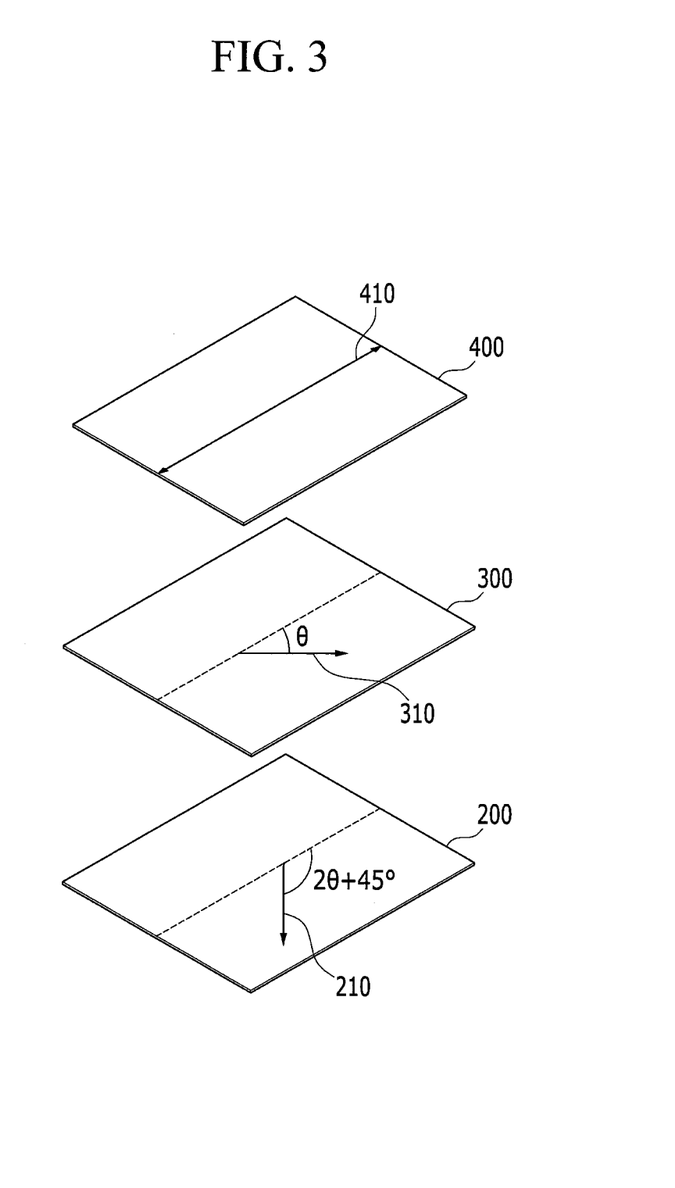
FIG. 3 is a diagram illustrating a phase axis of the retarder and an absorption axis of a polarizer illustrated in FIG. 1.

FIG. 1 is a schematic exploded perspective view of an organic light emitting diode display according to an exemplary embodiment of the present invention, FIG. 2 is a diagram for describing a film patterned retarder (FPR) as a retarder illustrated in FIG. 1, and FIG. 3 is a diagram illustrating a phase axis of the retarder and an absorption axis of a polarizer illustrated in FIG. 1.

Referring to FIG. 1, an organic light emitting diode display 1000 according to an exemplary embodiment of the present invention includes a display panel 100, a first retarder 200 positioned on the display panel 100, a second retarder 300 positioned on the first retarder 200, and a polarizer 400 positioned on the second retarder 300.

The display panel 100 may include an upper substrate, a lower substrate, and an organic emission layer between the upper substrate and the lower substrate and for emitting red, green, and blue colors.

A cell driver including a plurality of signal lines, a thin film transistor, and a passivation layer is formed on the lower substrate; and the upper substrate is an encapsulation substrate for encapsulation. In this case, the lower substrate may be formed of a glass substrate or a polymer film such as polyimide and/or the like, and may have flexible, bendable, rollable, foldable, and/or stretchable characteristics. Because the lower substrate has the flexible, bendable, rollable, foldable, and.or stretchable characteristics, the overall organic light emitting diode display 1000 may have the flexible, bendable, rollable, foldable, and/or stretchable characteristics. The upper substrate may be formed in a form of a glass substrate, a polymer film such as polyimide and/or the like, or a thin film encapsulation, and when the upper substrate is formed of the thin film encapsulation, at least one organic layer and at least one inorganic layer may be alternately stacked to each other.

In some embodiments, the cell driver includes a switching transistor, a driving transistor, and a storage capacitor. The switching transistor supplies a data signal from a data line in response to a scan signal of a gate line, and the driving transistor controls a current quantity flowing in the organic light emitting diode through a connection electrode in response to the data signal from the switching transistor. Even when the switching transistor is turned off, the storage capacitor serves to make a constant current flow through the driving transistor.

The organic emission layer is a layer which emits light while excitons formed by a combination of holes and electrons injected from a first electrode and a second electrode, respectively, fall into a ground state. A hole transportation layer which is formed between the first electrode and the organic emission layer may further include a hole injection layer for injecting holes into the organic emission layer well. Further, an electron transportation layer formed between the organic emission layer and the second electrode may further include an electron injection layer for injecting electrons into the organic emission layer as well. The organic emission layer may be formed in various known or suitable forms.

The organic emission layer may include three organic light emitting diodes which emit red, green, and blue colors. However, according to the exemplary embodiment of the present invention, a plurality of (two or four) organic light emitting diodes may be formed. Also, one or more of the plurality of organic light emitting diodes may form an image, and one organic light emitting diode may form a pixel which is a minimum unit for forming the image.

However, the organic light emitting diode display 1000 has a contrast which is greatly reduced due to an intensity of external light. Therefore, the organic light emitting diode display 1000 includes the display panel 100 having the retarders 200 and 300 and the polarizer 400 disposed thereon to reduce or prevent the contrast from being reduced due to the external light, thereby enhancing visibility.

Referring to FIGS. 1 to 3, the organic light emitting diode display 1000 according to the exemplary embodiment of the present invention includes the first retarder 200 and the second retarder 300 which are disposed between the display panel 100 and the polarizer 400.

First, the polarizer 400 converts the external light incident on the organic light emitting diode display 1000 into light of linear polarization.

The polarizer 400 may be, in some embodiments, made of poly vinyl alcohol (PVA), and the polarizer 400 allows the external light coinciding with a polarization axis to pass through it and absorbs and/or blocks the external light which does not coincide with the polarization axis.

Upper and lower portions of the polarizer 400 may be further attached with a protective film for physically supporting and/or protecting the polarizer 400. The protective film may be made of acetate-based resin like triacetyl cellulose (TAC), polyester-based resin, polycarbonate-based resin, polyamide-based resin, polyimide-based resin, polyolefin-based resin, acrylic resin, and/or the like.

The first retarder 200 is positioned on the display panel 100 and has a λ/4 phase difference value. That is, the first retarder serves as a quarter wave plate (QWP) which converts the linear polarization into circular polarization and/or converts the circular polarization into the linear polarization.

The first retarder 200 may be formed of a liquid crystal coating layer including a first reactive liquid crystal 230, as shown in FIG. 2.

The first retarder 200 may include an alignment layer and the first reactive liquid crystal 230 which may be coated on the alignment layer. The first reactive liquid crystal 230 is an organic matter including photopolymerization reaction groups which are provided at both ends of a liquid crystal molecule, in which, when being irradiated with ultraviolet rays, photopolymerization reaction groups are connected to each other. In some embodiments, since the first reactive liquid crystal 230 has a self-alignment characteristic, the first reactive liquid crystal 230 is aligned in the same or substantially the same direction as an alignment direction of the alignment layer and is provided with a first optical axis 210 in the alignment direction of the alignment layer.

The alignment layer is aligned on the display panel 100 in a constant direction, and the first reactive liquid crystal 230 is coated on the alignment layer. The first reactive liquid crystal 230 is provided with the first optical axis 210 in the alignment direction of the alignment layer, and therefore the alignment direction of the alignment layer is inclined by 2θ+45° based on an absorption axis direction 410 of the polarizer 400. Next, the first reactive liquid crystal 230, by being irradiated with the ultraviolet rays, is cured to form the first retarder 200. Further, the first retarder 200 may be formed of a coating layer made of reactive mesogen. To form the coating layer made of the reactive mesogen, a method of forming the alignment layer, applying a curable composition including the reactive mesogen, and aligning and curing the reactive mesogen in the alignment layer is used.

In this embodiment, the first retarder 200 is formed by applying the alignment layer on the display panel 100 and coating the reactive liquid crystal, and the first retarder 200 may be formed by a roll to roll method to make a thin thickness.

The second retarder 300 is positioned on the first retarder 200.

The second retarder 300 has a λ/2 phase difference value. That is, the second retarder serves as a half wave plate (HWP) which converts the linear polarization into the circular polarization or converts the circular polarization into the linear polarization.

The second retarder 300 may be formed of a liquid crystal coating layer or an oriented film layer which includes a second reactive liquid crystal 330.

The second retarder 300 may include an alignment layer and the second reactive liquid crystal 330 which may be coated on the alignment layer. The second reactive liquid crystal 330 is an organic matter including photopolymerization reaction groups which are provided at both ends of a liquid crystal molecule, in which when being irradiated with ultraviolet rays, photopolymerization reaction groups are connected to each other. In some embodiments, since the second reactive liquid crystal 330 has a self-alignment characteristic, the second reactive liquid crystal 330 is aligned in the same or substantially the same direction as an alignment direction of the alignment layer and is provided with a second optical axis 310 in the alignment direction of the alignment layer.

The alignment layer is aligned on the first retarder 200 in a constant direction and the second reactive liquid crystal 330 is coated on the alignment layer. The second reactive liquid crystal 330 is provided with the second optical axis 310 in the alignment direction of the alignment layer, and therefore the alignment direction of the alignment layer is inclined by θ based on the absorption axis direction 410 of the polarizer 400. Next, the second reactive liquid crystal 330, by being irradiated with the ultraviolet rays, is cured to form the second retarder 300. Further, the second retarder 300 may be formed of the coating layer made of the reactive mesogen. To form the coating layer made of the reactive mesogen, a method of forming the alignment layer, applying a curable composition including the reactive mesogen, and aligning and curing the reactive mesogen in the alignment layer is used.

Further, according to another exemplary embodiment of the present invention, the second retarder 300 may be formed of the oriented film layer using an oriented process of a plastic film. The oriented film layer may be a triacetyl cellulose (TAC)-based, polycarbonate (PC)-based, polymethyl(meta)acrylate-based, polyethylene terephthalate-based, and/or a cycloolefin (COP)-based polymer layer.

In some embodiments, the first retarder 200 and the second retarder 300 may each be formed as a film patterned retarder (FPR).

The film patterned retarder includes a plurality of left retarder patterns and a plurality of right retarder patterns. The left retarder patterns and the right retarder patterns are formed to be alternately aligned. For example, the retarder patterns with odd numbered lines may be formed with the left retarder patterns, and the retarder patterns with even numbered lines may be formed with the right retarder patterns. However, the present invention is not limited thereto and may be formed in the opposite to the above case, e.g., the retarder patterns with odd numbered lines may be formed with the right retarder patterns and the retarder patterns with even numbered lines may be formed with the left retarder patterns.

Figure 4A:
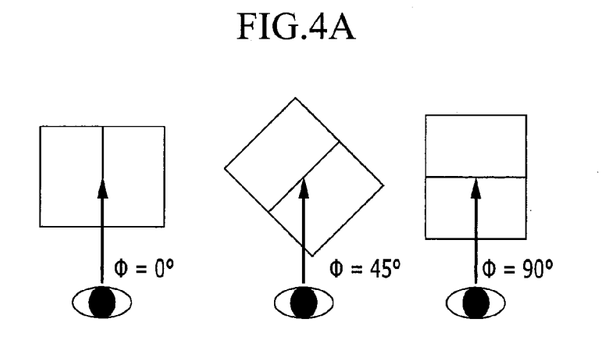
FIGS. 4A-4B illustrate a change in reflection visual sensitivity of the organic light emitting diode display according to an exemplary embodiment of the present invention in response to a change in a viewing angle.
Figure 4B:
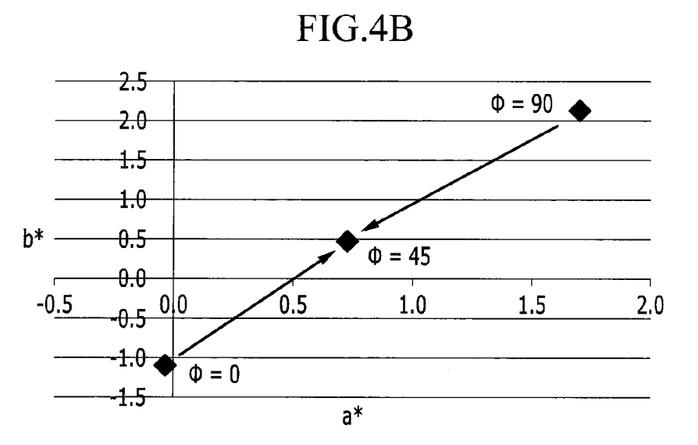

FIGS. 4A-4B illustrate a change in reflection visual sensitivity of the organic light emitting diode display according to an exemplary embodiment of the present invention in response to a change in a viewing angle, in which FIG. 4A illustrates the change in the viewing angle and FIG. 4B illustrates a color index in response to the change in the viewing angle on a CIE 1976 Lab color coordinate system (a* represents a red direction and b* represents a yellow direction).

Referring to FIGS. 4A-4B, in the organic light emitting diode display 1000 according to the exemplary embodiment of the present invention, a case in which the viewing angle Φ is 0° and 90° on the CIE 1976 Lab color coordinate system and a case in which the viewing angle Φ is 45° have the same or substantially the same chromaticity which represents color and saturation.

That is, in the organic light emitting diode display 1000 according to the exemplary embodiment of the present invention, the first retarder 200 having the λ/4 phase difference value (which is formed between the display panel 100 and the polarizer 400 and the second retarder 300 having the λ/2 phase difference value) is formed between the first retarder 200 and the polarizer 400, the optical axis 210 of the first retarder 200 is inclined by 2θ+45° with respect to the absorption axis 410 of the polarizer 400, and the optical axis 310 of the second retarder 300 is inclined by θ with respect to the absorption axis 410 of the polarizer 400, thereby enhancing the reflection visual sensitivity in response to the change in the viewing angle.

However, when the first retarder 200 and the second retarder 300 are formed of a liquid crystal coating layer, wavelength dispersibility of the phase difference may be worse and thus the chromaticity and luminance may deteriorate.

First, external light reflection suppression using a general linear polarizer and a general λ/4 retarder will be described with reference to FIGS. 5A-5B.

Figure 5A:
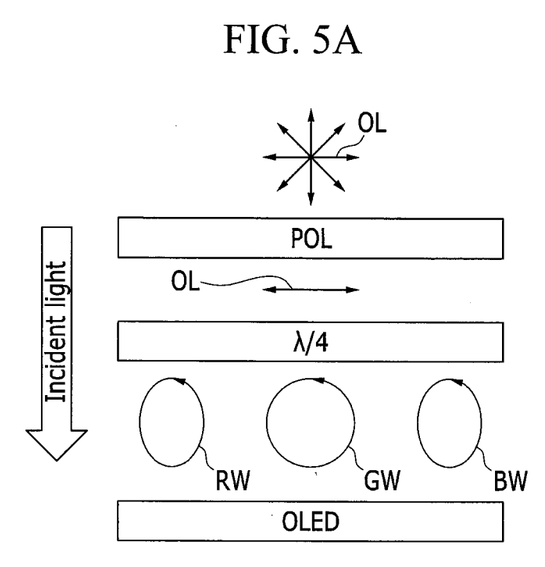
FIGS. 5A-5B illustrate cross-sectional views illustrating external light reflection using a general linear polarizer and a retarder.
Figure 5B:
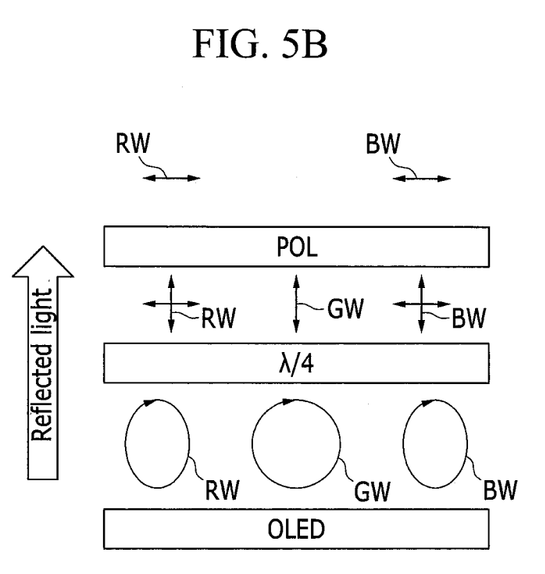

FIGS. 5A-5B illustrate cross-sectional views illustrating external light reflection using a general linear polarizer and a retarder.

As illustrated in FIG. 5A, external light OL is incident on a linear polarizer POL and thus light which does not coincide with a linear polarization axis of the linear polarizer POL while passing through the linear polarizer POL is absorbed by the linear polarizer POL, such that the external light OL is linearly polarized while passing through the linear polarizer POL.

The linearly polarized external light OL may be, for example, left-handedly circularly polarized while passing through the λ/4 retarder (λ/4). In this case, the phase difference value of the λ/4 retarder (λ/4) generally meets a green wavelength (for example, 550 nm) having high light efficiency. When the linearly polarized external light OL passes through the λ/4 retarder (λ/4), among light RW having a red wavelength, light GW having a green wavelength, and light BW having a blue wavelength which are included in the external light OL, the light GW having the green wavelength is circularly polarized while the light RW having a red wavelength and the light BW having a blue wavelength are elliptically polarized.

As illustrated in FIG. 5B, the light RW having a red wavelength, the light GW having a green wavelength, and the light BW having a blue wavelength are each phase-delayed by 180° while the light RW having a red wavelength, the light GW having a green wavelength, and the light BW having a blue wavelength are reflected from the organic light emitting diode (OLED) and the light GW having a green wavelength among the light RW having a red wavelength, the light GW having a green wavelength, and the light BW having a blue wavelength is completely linearly polarized while again passing through the λ/4 retarder (λ/4) and thus is absorbed into the linear polarizer POL, while the light RW having a red wavelength and the light BW having a blue wavelength are not completely changed into linear polarization and thus are different from the optical axis of the linear polarizer POL and pass through the linear polarizer POL to be visualized at the outside. That is, the external light OL is reflected from the organic light emitting diode (OLED) and thus light leakage of some of the light RW having a red wavelength and the light BW having a blue wavelength, respectively, among the reflected light is visualized at the outside.

Figure 6:
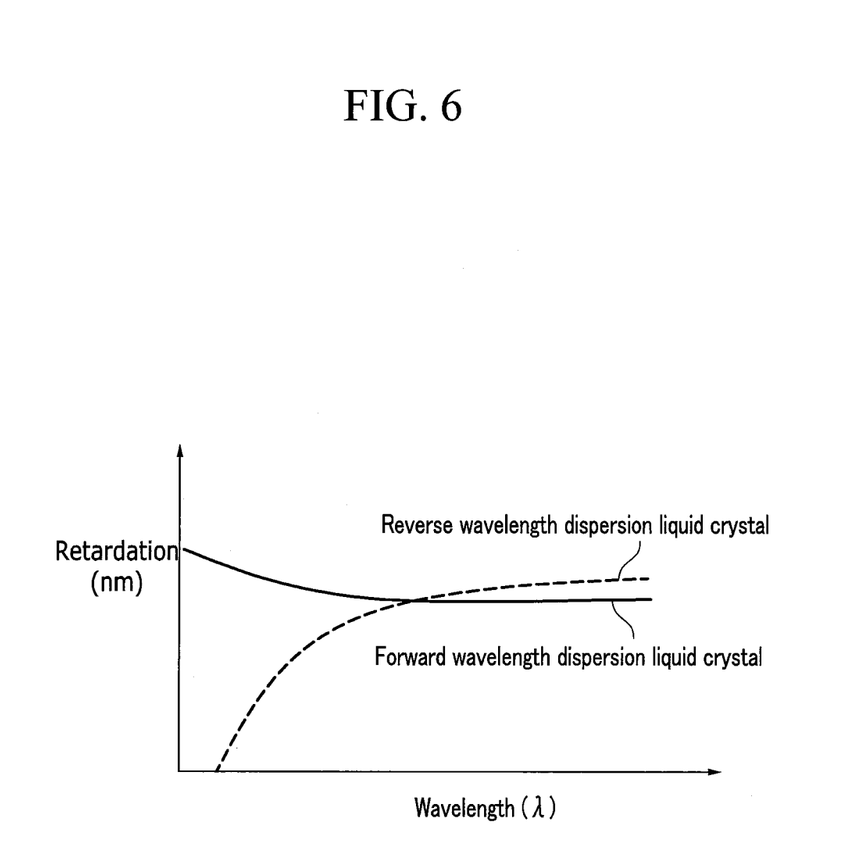
FIG. 6 is a graph illustrating a change in phase difference values in response to wavelengths of each of a reverse wavelength dispersion liquid crystal and a forward wavelength dispersion liquid crystal.

FIG. 6 is a graph illustrating a change in phase difference value in response to wavelengths of each of a reverse wavelength dispersion liquid crystal and a forward wavelength dispersion liquid crystal. An X axis of the graph illustrated in FIG. 6 is the wavelength and a Y axis is the phase difference value.

FIG. 6 illustrates that the forward wavelength dispersion liquid crystal has a reduced phase difference value in response to an increase in a wavelength or has the phase difference value which is not changed, and the reverse wavelength dispersion liquid crystal has the increased phase difference value in response to the increase in a wavelength.

The organic light emitting diode display 1000 according to an exemplary embodiment of the present invention uses a reverse wavelength dispersion liquid crystal in which the phase difference value of the phase difference layer is changed in response to the wavelength of the external light incident on the phase difference layer to enhance the external light reflection suppression efficiency against the general λ/4 retarder described above.

Figure 7A:
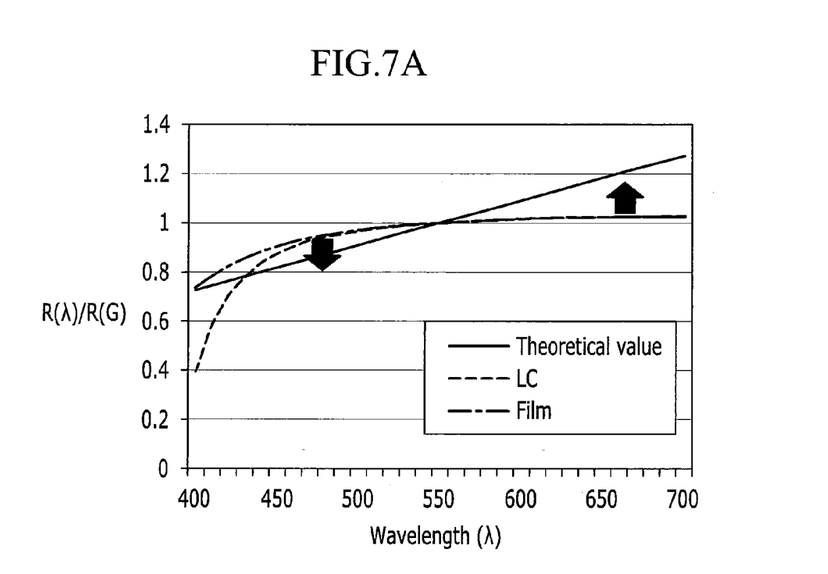
FIGS. 7A-7B illustrate a graph and a table, respectively, for illustrating a theoretical phase difference value in response to a wavelength, a phase difference value of a film having reverse wavelength dispersion characteristics depending on the wavelength, and a phase difference value of a liquid crystal having the reverse wavelength dispersion characteristics in response to the wavelength.
Figure 7B:
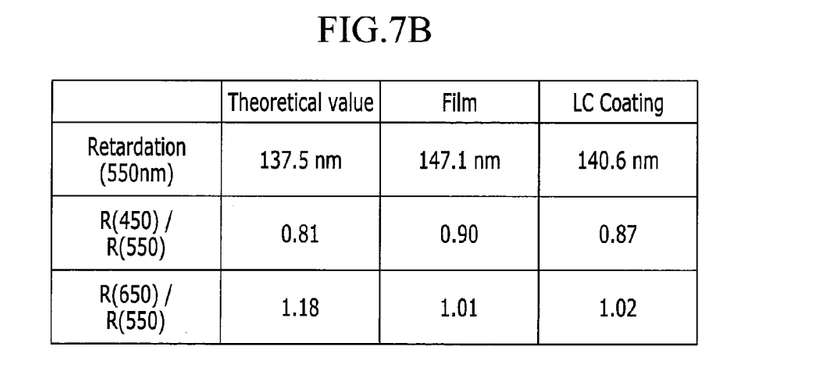

FIGS. 7A-7B illustrate a graph and a table, respectively, illustrating a theoretical phase difference value in response to a wavelength, a phase difference value of a film having reverse wavelength dispersion characteristics in response to the wavelength, and a phase difference value of a liquid crystal having the reverse wavelength dispersion characteristics in response to the wavelength. In FIG. 7A, the X-axis is the wavelength (nm) and the Y-axis is the ratio of the phase difference value depending on each wavelength to the phase difference value depending on a green wavelength of 550 nm.

As can be seen in FIGS. 7A-7B, each of the film and the liquid crystal coating (LC coating) that has the reverse wavelength dispersion characteristics corresponding to the phase difference value set for the green wavelength (550 nm) is different from the theoretical values. It may be appreciated that the film and the liquid crystal coating (LC coating) having the reverse wavelength dispersion characteristics may each not completely generate forward reflection within red and blue wavelengths, respectively. In particular, it may be appreciated that the film and the liquid crystal coating (LC coating) approach the theoretical value at a blue wavelength of 450 nm but have a large difference at the red wavelength of 650 nm.

The organic light emitting diode display 1000 according to the exemplary embodiment of the present invention may control the thicknesses of the first retarder 200 and the second retarder 300 to enhance the wavelength dispersion characteristics.

The first retarder 200 and the second retarder 300 according to the exemplary embodiment of the present invention may each include the reverse wavelength dispersion liquid crystal, and the thickness of the first retarder 200 may be formed to be two times as large as that of the second retarder 300.

Figure 8:
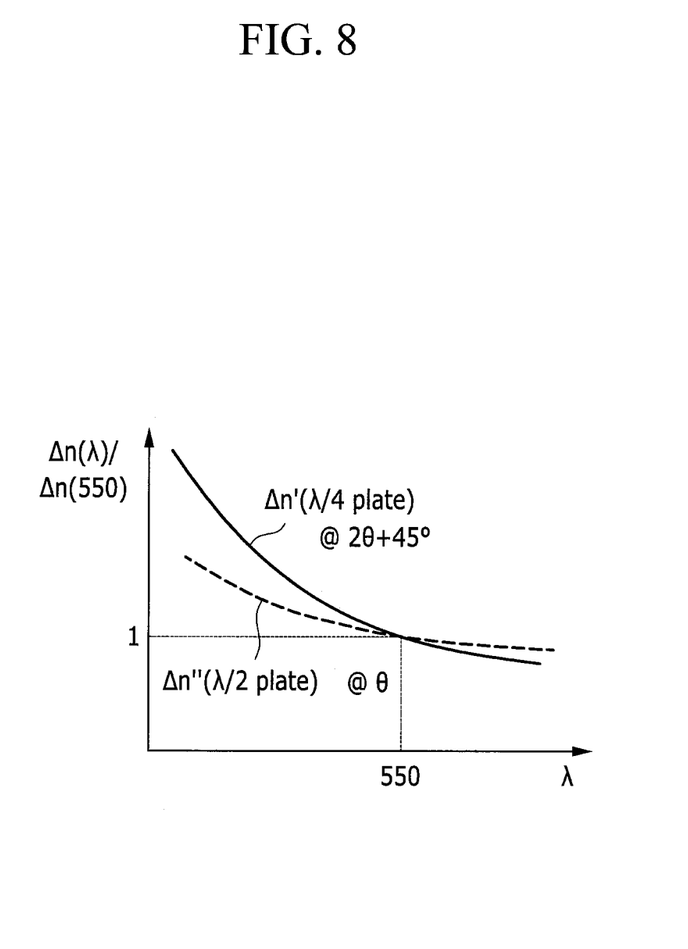
FIG. 8 is a diagram describing a relationship between thicknesses of a first retarder and a second retarder of the organic light emitting diode display of FIG. 1.

FIG. 8 is a diagram describing a relationship between the thicknesses of the first retarder and the second retarder.

Referring to FIG. 8, the thickness of the first retarder 200 and the thickness of the second retarder 300 may meet the following [equation 1].

$$\underbrace{\left(\frac{\Delta n'(\lambda)}{\Delta n'(550m)} - 1\right)}_{\text{First retarder}} = 2x\underbrace{\left(\frac{\Delta n''(\lambda)}{\Delta n''(550m)} - 1\right)}_{\text{Second retarder}} \quad \text{Equation 1}$$

In the above Equation 1, $\Delta n'$ represents a phase difference value in a thickness direction for $\lambda$ in the first retarder 200 and $\Delta n''$ represents a phase difference value in a thickness direction for $\lambda$ in the second retarder 300.

That is, the organic light emitting diode display 1000 according to the exemplary embodiment of the present invention may have controlled values for the thicknesses of the first retarder 200 and the second retarder 300. For example, the phase difference value in the thickness direction may be controlled to enhance the wavelength dispersion characteristics.

Further, the first retarder 200 and the second retarder 300 according to the exemplary embodiment of the present invention meet the following [Equation 2] and may be an A-plate of which the optical axis is vertically positioned to the absorption axis 410 of the polarizer 400.

$$nx > ny = nz \quad \text{Equation 2}$$

In the above Equation 2, nx represents a refractive index in an x-axis direction on a surface of the film, ny represents a refractive index in a y-axis direction on a surface of the film, and nz represents a refractive index in a thickness direction of the film.

The A-plate having a structure in which polymethyl methacrylate (PMMA), polystyrene (PS), and polymethyl methacrylate (PMMA) are sequentially stacked or a structure in which at least one layer is modified polycarbonate (PC) may be used. Further, if the A-plate satisfies optical characteristics within the scope of the present invention, the A-plate may be applied to the present invention without being limited to a material. In more detail, the A-plate made of a material selected from a group consisting of triacetyl cellulose (TAC), cycloolefin polymer (COP), cycloolefin copolymer (COC), polyethylene terephthalate (PET), polypropylene (PP), polycarbonate (PC), polysulfone (PSF), and a polymethyl methacrylate (PMMA) may be used.

The exemplary embodiment of the present invention describes that the first retarder 200, the second retarder 300, and the polarizer 400 each are one independent film layer or coating layer, but according to another exemplary embodiment of the present invention, the first retarder 200, the second retarder 300, and the polarizer 400 may be formed of one film layer or coating layer including the first retarder 200, the second retarder 300, and the polarizer 400.

Figure 9:
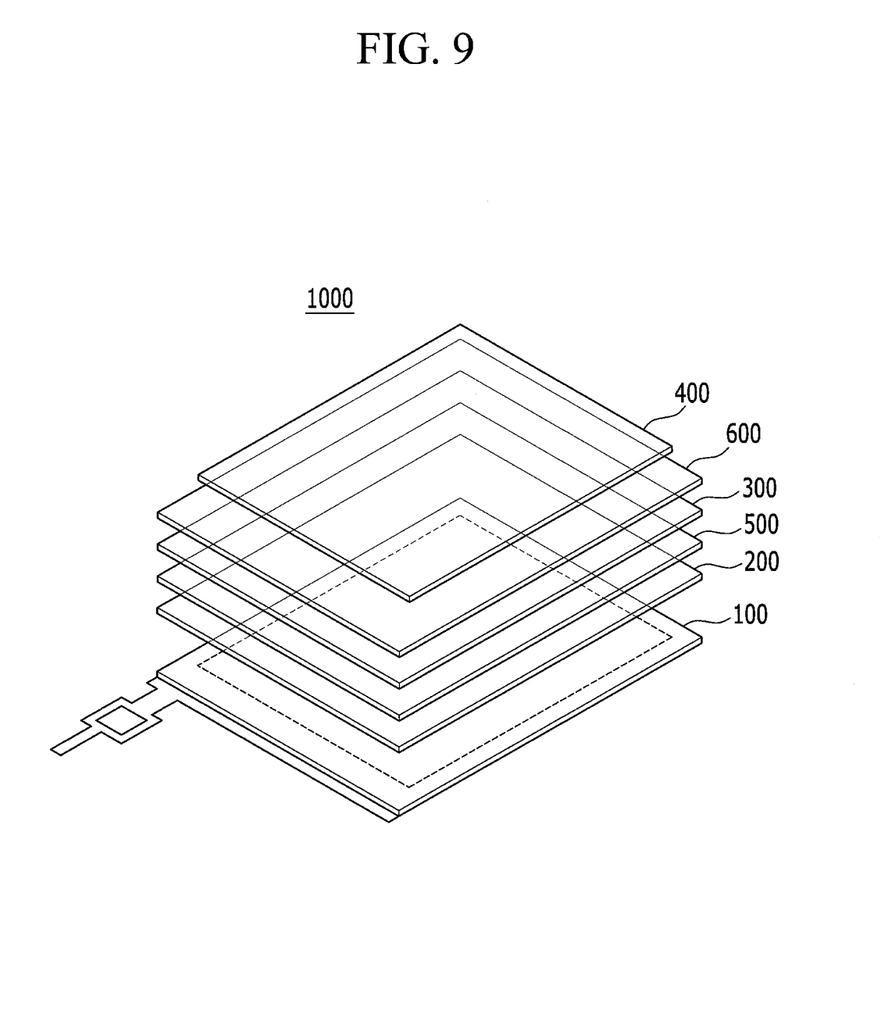
FIG. 9 is a schematic exploded perspective view of an organic light emitting diode display according to another exemplary embodiment of the present invention.

FIG. 9 is a schematic exploded perspective view of an organic light emitting diode display according to another exemplary embodiment of the present invention, in which the organic light emitting diode display is the same as the organic light emitting diode display illustrated in FIG. 1 as described above except that it further includes a pressure sensitivity adhesive. Therefore, the same components are denoted by the same reference numerals and the repeated description thereof may be omitted.

Referring to FIG. 9, in the organic light emitting diode display 1000 according to another exemplary embodiment of the present invention, a first pressure sensitivity adhesive 500 may be further provided between the first retarder 200 and the second retarder 300, and a second pressure sensitivity adhesive 600 may be further provided between the second retarder 300 and the polarizer 400.

The first pressure sensitivity adhesive 500 may attach the first retarder 200 and the second retarder 300, and the second pressure sensitivity adhesive 600 may attach the second retarder 300 and the polarizer 400.

The first pressure sensitivity adhesive 500 and the second pressure sensitivity adhesive 600 are generally made of a material which does not limit light transmission. For example, as an adhesive resin, acryl-based, urethane-based, polyisobutylene-based, styrenebutadienerubber (SBR)-based, rubber-based, polyvinyl ether-based, epoxy-based, melamine-based, polyester-based, phenol-based, silicon-based resin, a copolymer thereof, and/or the like may be used. In some embodiments, the first pressure sensitivity adhesive 500 may be made of a material which may block or prevent moisture from penetrating into the organic light emitting diode display 1000 and may be made of acryl-based resin or silicon-based resin having excellent heat resistance. However, the material as described above is only an example and any suitable materials having an adhesive function may be used.

The first pressure sensitivity adhesive 500 and the second pressure sensitivity adhesive 600 may each serve as an adhesive and may also each have an elasticity (e.g., a predetermined elasticity) to serve to protect the film layer and/or the coating layer from external impact.

Expressions such as "at least one of," when preceding a list of elements, modify the entire list of elements and do not modify the individual elements of the list. Further, the use of "may" when describing embodiments of the present invention refers to "one or more embodiments of the present invention." It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the present inventive concept.

The terminology used herein is for the purpose of describing particular embodiments only and is not intended to be limiting of the inventive concept. As used herein, the singular forms "a" and "an" are intended to include the plural forms as well, unless the context clearly indicates otherwise. As used herein, the term "and/or" includes any and all combinations of one or more of the associated listed items. Also, the term "exemplary" is intended to refer to an example or illustration.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their respective equivalents.

DESCRIPTION OF SOME OF THE REFERENCE SYMBOLS

| | |
|---|---|
| 100: Display panel | 200: First retarder |
| 300: Second retarder | 400: Polarizer |
| 500: First pressure sensitivity adhesive | 600: Second pressure sensitivity adhesive |

What is claimed is:

1. An organic light emitting diode display, comprising:
a display panel;
a first retarder on the display panel;
a second retarder on the first retarder; and
a polarizer on the second retarder,
wherein a first optical axis of the first retarder is inclined by 2θ+45° relative to an absorption axis of the polarizer, and a second optical axis of the second retarder is inclined by θ relative to the absorption axis of the polarizer; and
wherein the first retarder comprises a first reactive liquid crystal and the second retarder comprises a second reactive liquid crystal.

2. The organic light emitting diode display of claim 1, wherein:
the first retarder has a λ/4 phase difference value and the second retarder has a λ/2 phase difference value.

3. The organic light emitting diode display of claim 1, wherein:
the first retarder comprises a liquid crystal coating layer, and
the second retarder comprises a liquid crystal coating layer and/or an oriented film layer.

4. The organic light emitting diode display of claim 3, wherein:
the liquid crystal coating layer comprises a reverse wavelength dispersion liquid crystal.

5. The organic light emitting diode display of claim 4, wherein:
the liquid crystal coating layer comprises a photo-alignment layer and a liquid crystal layer aligned on the photo-alignment layer.

6. The organic light emitting diode display of claim 5, wherein:
the liquid crystal coating layer comprises reactive mesogen.

7. The organic light emitting diode display of claim 3, wherein:
the liquid crystal coating layer is an A-Plate liquid crystal coating layer.

8. The organic light emitting diode display of claim 7, wherein:
the A-plate comprises a material selected from a group consisting of triacetyl cellulose (TAC), cycloolefin polymer (COP), cycloolefin copolymer (COC), polyethylene terephthalate (PET), polypropylene (PP), polycarbonate (PC), polysulfone (PSF), and a polymethyl methacrylate (PMMA).

9. The organic light emitting diode display of claim 7, wherein:
the A-plate has a structure in which polymethyl methacrylate (PMMA), polystyrene (PS), and polymethyl methacrylate (PMMA) are sequentially stacked.

10. The organic light emitting diode display of claim 3, wherein:
the second retarder comprises the oriented film layer and the oriented film layer is a triacetyl cellulose (TAC)-based, polycarbonate (PC)-based, polymethyl(meta) acrylate-based, polyethylene terephthalate-based, and/or cycloolefin (COP)-based polymer layer.

11. The organic light emitting diode display of claim 1, wherein:
the polarizer is a linear polarizer.

12. The organic light emitting diode display of claim 1, further comprising:
a first pressure sensitivity adhesive between the first retarder and the second retarder.

13. The organic light emitting diode display of claim 1, further comprising:
a second pressure sensitivity adhesive between the second retarder and the polarizer.

14. An organic light emitting diode display, comprising:
a display panel;
a first retarder on the display panel;
a second retarder on the first retarder; and
a polarizer on the second retarder,
wherein a first optical axis of the first retarder is inclined by 2θ+45° relative to an absorption axis of the polarizer, and a second optical axis of the second retarder is inclined by θ relative to the absorption axis of the polarizer; and
wherein a thickness of the first retarder is two times as large as that of the second retarder.

15. The organic light emitting diode display of claim 14, wherein:

the thickness of the first retarder and the thickness of the second retarder meet the following Equation 1:

$$\overset{\text{first retarder}}{\left(\frac{\Delta n'(\lambda)}{\Delta n'(550m)} - 1\right)} = 2x\overset{\text{second retarder}}{\left(\frac{\Delta n''(\lambda)}{\Delta n''(550m)} - 1\right)} \quad \text{Equation 1}$$

wherein $\Delta n'$ represents a phase difference value in a thickness direction for $\lambda$ in the first retarder and $\Delta n''$ represents a phase difference value in a thickness direction for $\lambda$ in the second retarder.

16. An organic light emitting diode display, comprising:
a display panel;
a first retarder on the display panel;
a second retarder on the first retarder; and
a polarizer on the second retarder,
wherein a first optical axis of the first retarder is inclined by 2θ+45° relative to an absorption axis of the polarizer, and a second optical axis of the second retarder is inclined by θ relative to the absorption axis of the polarizer; and
wherein the first retarder and the second retarder are each a film patterned retarder (FPR) which comprises a plurality of left retarder patterns and a plurality of right retarder patterns.

17. An organic light emitting diode display, comprising:
a display panel;
a first retarder on the display panel;
a second retarder on the first retarder; and
a polarizer on the second retarder,
wherein a first optical axis of the first retarder is inclined by 2θ+45° relative to an absorption axis of the polarizer, and a second optical axis of the second retarder is inclined by θ relative to the absorption axis of the polarizer;
wherein the first retarder comprises a first reactive liquid crystal and the second retarder comprises a second reactive liquid crystal; and
wherein the display panel is flexible, bendable, rollable, foldable, and/or stretchable.

* * * * *